United States Patent [19]
Häfner

[11] Patent Number: 5,149,121
[45] Date of Patent: Sep. 22, 1992

[54] FORCE MEASURING DEVICE

[75] Inventor: Hans W. Häfner, Aichach-Walchshofen, Fed. Rep. of Germany

[73] Assignee: Pfister GbmH, Augsburg, Fed. Rep. of Germany

[21] Appl. No.: 619,801

[22] Filed: Nov. 27, 1990

Related U.S. Application Data

[60] Continuation of Ser. No. 380,414, Jul. 17, 1989, abandoned, which is a division of Ser. No. 226,592, Aug. 1, 1988, Pat. No. 4,864,874.

[30] Foreign Application Priority Data

Aug. 5, 1987 [DE] Fed. Rep. of Germany ....... 3725917
May 27, 1988 [DE] Fed. Rep. of Germany ....... 3818126

[51] Int. Cl.⁵ .............................................. B60D 1/14
[52] U.S. Cl. ................................. 280/432; 280/446.1; 280/504; 280/511; 73/862.621; 188/112 R
[58] Field of Search ............... 280/511, 422, 504, 449, 280/446.1, 493, 494, 477, DIG. 14; 180/904; 188/112 A, 112 R; 73/862.57, 862.58, 862.65, 862.68, 862.38, 862.47, 862.62, 862.63, 862.64, DIG. 4

[56] References Cited
U.S. PATENT DOCUMENTS

| | | | |
|---|---|---|---|
| 1,994,388 | 3/1935 | Erichsen | 73/862.62 |
| 2,640,353 | 6/1953 | Hefner | 73/862.57 |
| 2,641,926 | 6/1953 | Eisenbart | 73/862.57 |
| 2,856,036 | 10/1958 | Mullen | 280/511 |
| 3,410,135 | 11/1968 | Reynaud | 73/862.38 |
| 3,955,652 | 5/1976 | Nilsson et al. | 280/432 |
| 4,231,442 | 11/1980 | Birkenholm | 280/432 |
| 4,555,766 | 11/1985 | Wright | |
| 4,818,035 | 4/1989 | McNinch, Jr. | 188/112 R |
| 4,830,399 | 5/1989 | Hafner | 280/707 |
| 5,060,965 | 10/1991 | Haefner et al. | 280/504 |

FOREIGN PATENT DOCUMENTS

| | | | |
|---|---|---|---|
| 2117424 | 4/1971 | Fed. Rep. of Germany. | |
| 3530817 | 3/1987 | Fed. Rep. of Germany | 280/446.1 |
| 3612053 | 10/1987 | Fed. Rep. of Germany | 280/511 |
| 8602323 | 4/1986 | Sweden. | |
| 583110 | 12/1976 | Switzerland. | |

*Primary Examiner*—Charles A. Marmor
*Assistant Examiner*—A. M. Boehler
*Attorney, Agent, or Firm*—Armstrong & Kubovcik

[57] ABSTRACT

A novel force measuring device of simple design is provided with complementary stop surfaces protecting the device against over-loading. Alternatively, overloading is prevented by duplicating the force measuring device with two portions operating in opposite directions of force application. Such force measuring devices are advantageously incorporated in couplings between a motor driven vehicle and a further vehicle to be coupled thereto. Signals derived from these force measuring devices are used in a board computer for controlling the operation of the motor driven vehicle and the further vehicle coupled thereto.

16 Claims, 3 Drawing Sheets

FORCE MEASURING DEVICE

This application is a continuation of application Ser. No. 380,414 filed Jul. 17, 1989, now abandoned which is a divisional of U.S. Ser. No. 226,592, filed Aug. 1, 1988, now U.S. Pat. No. 4,864,874, issued Sep. 12, 1989.

FIELD OF THE INVENTION

The invention relates to a force measuring device using at least one pressure sensor and adapted for application of forces into opposite directions.

DESCRIPTION OF THE PRIOR ART

The German laid open patent publication No. 36 25 842 discloses force measuring devices using a pressure sensor operating on a piezo-electric basis or by using strain gauges embedded in an elastomeric material.

The German laid open patent publication No. 35 34 211 relates to a vehicle and a method for operating such a vehicle. Force measuring devices are used for optimizing the driving characteristics of the vehicle by determining forces exerted to the wheels, wheel suspensions, etc.. In general, the force measuring devices are loaded in one direction only, i.e. by the force exerted to a wheel. Under extreme conditions as with cars used in rallies forces may be exerted onto the vehicle in the opposite direction, for example, when a wheel is freely elevated above ground or when driving the car over a very uneven ground.

In general, when using force measuring devices as defined above, only forces acting in one direction may be determined. Furthermore, there is a danger that the force measuring device is torn to pieces when pulling forces are applied thereonto.

Beside determining forces acting in vertical direction there are applications where forces in horizontal direction are to be determined. For example, it would be desirable to determine tensional forces exerted by a trailer coupled to a motor car. When going down a slope the direction of the force will be reversed and the trailer may push the motor car.

SUMMARY OF THE INVENTION

It is an object of the present invention to provide a force measuring device protected against destruction by overloading.

It is a further object of the present invention to provide a force measuring device for determining forces acting in two opposite directions.

It is a still further object of the instant invention to provide a trailer coupling including means permitting a control of a driven vehicle having coupled thereto a further vehicle.

It is a further object of the instant invention to provide a motor driven vehicle having coupled thereto another vehicle by means of a coupling and being provided with an improved control of the operation of the vehicles.

According to a first aspect of the invention there is provided a force measuring device comprising: a housing means having a cylindrical recess; a piston inserted into said recess and having a peripheral surface forming a cylindrical narrow gap with a cylindrical surface of said recess; elastomeric material filling said gap and fixedly adhering to the peripheral surfaces of said piston and said cylindrical recess; a pressure sensor means arranged in contact with said elastomeric material and measuring forces applied to said piston and transmitted by said elastomeric material to said pressure sensor means; and a limiting means for limiting movement of said piston relative to said housing in direction of a longitudinal axis of said piston.

According to a second aspect of the invention there is provided a trailer coupling for vehicles having a force measuring device incorporated therein and a vehicle using such a trailer coupling.

According to a further aspect of the invention there is provided a method for controlling the operation of a motor driven vehicle provided with a coupling means for coupling a further vehicle thereto, comprising the steps: Incorporating a force measuring means into said coupling means; providing a board computer means in said motor driven vehicle; connecting said force measuring means to said board computer means; controlling the operation of said motor driven vehicle by said board computer means in response of signals received by said board computer means from said force measuring means.

DESCRIPTION OF PREFERRED EMBODIMENTS

Figure 1:
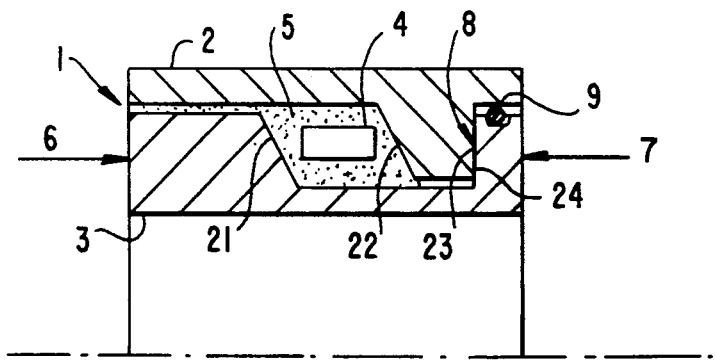
FIG. 1 is a sectional view of a first embodiment of a force measuring device according to the invention.

FIG. 1 shows a first embodiment of a force measuring device 1 including a cylindrical housing 2 having arranged in its interior a force introduction piston 3, preferably of tube-like shape. Elastomeric material 5, preferably silicon rubber fills a circular gap formed between complementary tapered annular surfaces 21 and 22 formed at the exterior peripheral surfaces of the piston 3 and the interior peripheral surfaces of the housing 2, respectively.

The force measuring device 1 as explained above may be loaded in the main force direction 6 and will output a signal corresponding to the force applied thereto. Upon force application in the direction 6 the force introduction piston 3 tends to be shifted slightly to the right (FIG. 1). The force measuring device 1 shown in FIG. 1 may be used for rather high forces or corresponding pressures up to several hundred bars in the main force direction 6. It should be noted, that a circular sealing 9 may be provided between the cylindrical housing 2 and the force introduction piston 3 for preventing any penetration of humidity or aggressive substances which may deteriorate the elastomeric material 5.

It should be understood, that the movement of the piston 3 is relative to the cylindrical housing 2. If a force is applied to the piston 3 in the opposite direction 7 the piston 3 would be drawn out of the housing 2. Therefore, a stop means 8 is provided limiting such a movement of the piston 3 relative to the housing 2. Specifically, opposing circular flanges 23, 24 extending radially may be formed complementary to each other on the exterior peripheral surfaces of the piston 3 and the interior peripheral surfaces of the housing 2, respectively. Thus, any force exerted onto the piston 3 in the direction 7 will move the piston 3 in FIG. 1 to the left until engagement of the annular surfaces 23, 24.

Figure 2:
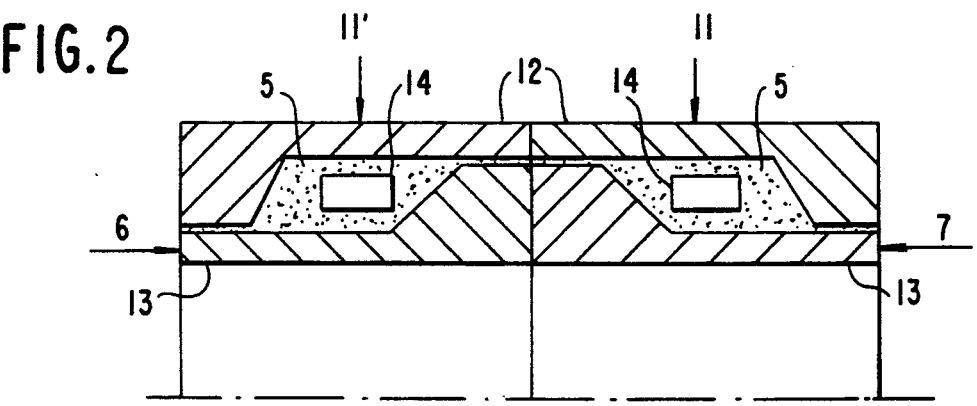
FIG. 2 is a sectional view of a second embodiment of the force measuring device according to the invention.

FIG. 2 shows a second embodiment of a force measuring device according to the invention using as a stop means for limiting the movement of a piston 13 in a housing 12 a second force measuring device 11' in addition to a force measuring device 11. The force measuring devices 11 and 11' have a similar, preferably an identical design and are combined with each other in an opposing manner.

Accordingly, considerable forces may be applied to the piston 13 both in the main force direction 6 or the opposite direction 7. Since the elastomeric material 5 is essentially incompressible there will be only a very slight relative movement between the housing 12 and the piston 13.

With a force measuring device according to the embodiment of FIG. 2 forces in two opposite directions may be determined.

Furthermore, using preloaded pressure sensor 14 permits a compensation of any differences in the characteristics of the pressure sensors in particular in a measuring region close to zero.

Figure 3:
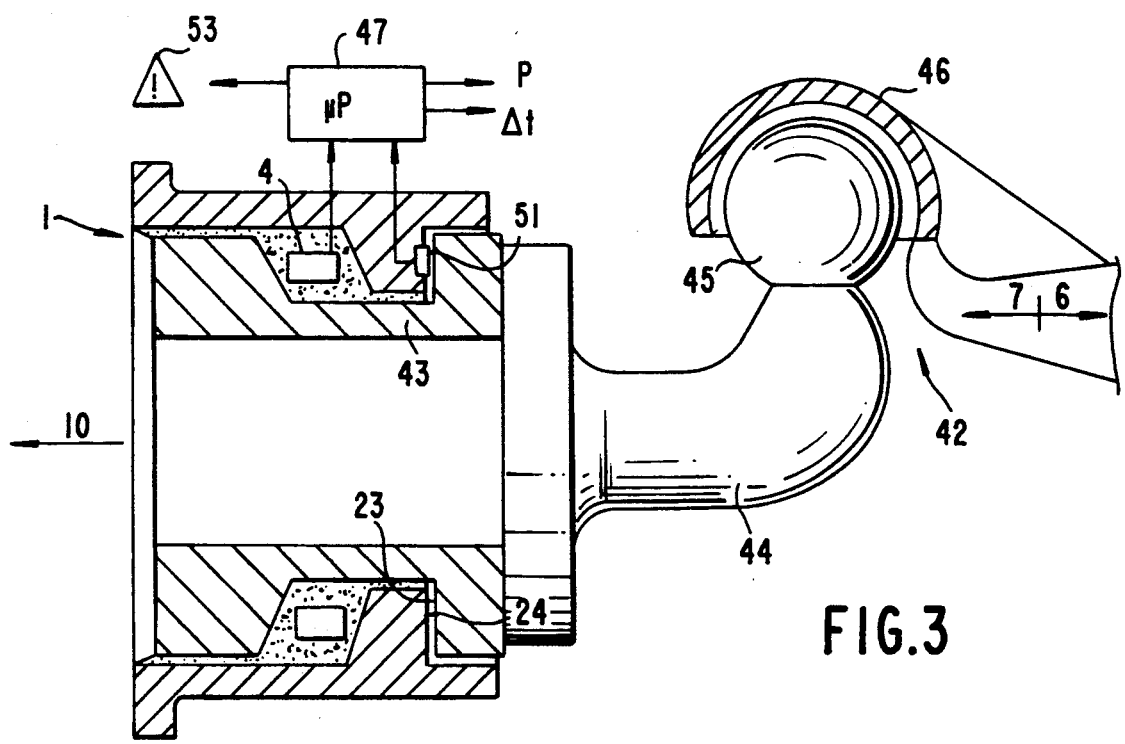
FIG. 3 is a schematic sectional view of a trailer coupling using a force measuring device according to FIG. 1.

FIG. 3 shows an application of a force measuring device according to FIG. 1 for a trailer coupling 42 shown as a ball head coupling and used for coupling a trailer to a motor car. A piston 43 has attached thereto, i.e. by screws, a coupling part 44 provided with the coupling ball 45. An engaging part 46 of a trailer (not shown) engages in a well known manner the ball 45.

In operation any force acting on the coupling 42 will be transmitted to the pressure sensor 4 generating an output signal in dependence on the force applied. The output signal of the pressure sensor 4 is transmitted to a microprocessor 47 of the automatic control system of the vehicle for evaluation therein and for controlling the motor, the gearing, the steering and/or the brakes of the vehicle and/or the brakes of the trailer. Under normal conditions pulling forces will be measured by the pressure sensor 4 and transmitted to the microprocessor 47. However, when braking the vehicle the trailer may exert a pushing force on the coupling 42 urging the force introduction piston 43 in FIG. 3 to the left, which may result in an engagement of the surfaces 23, 24. For indicating this situation a contact 51, i.e. piezo cristal contact, may be provided on the surfaces 24 or 23 connected to the microprocessor 47. Upon engagement of the surfaces 23, 24 the contact 51 of an electrical circuit (not shown) will be closed transmitting a signal to the microprocessor 47, indicating a loading of the coupling in the pushing direction 7. Now, the microprocessor 47 may issue an acoustic or visual alarm signal indicated by reference numeral 53 in FIG. 3 and/or may increase the braking of the trailer.

Alternatively, a design of a force measuring device according to FIG. 2 may be used for more accurate control by determining both the pushing and the pulling forces acting on the coupling 42 and using these forces for the control of the operation of the vehicle.

As a further alternative the pressure sensor 4 may be preloaded in order to enable it to measure forces in opposite directions.

As indicated in FIG. 3, the microprocessor 47 may generate signals for controlling the breaking pressure p and/or a timing signal indicating the coincidence or precession of the begining of breaking of the trailer in respect of the vehicle. Preferably, the microprocessor 47 has stored therein corresponding reference values which become effective in dependence on the loading of the vehicle and the momentary operational parameters of the vehicle and the characteristics of the road, as an upward or downward slope thereof.

It should be noted, that when using the design according to FIG. 2 for a coupling according to FIG. 3 the operation of the vehicle in combination with the trailer may be controlled more accurately. Specifically, the breaks of the trailer may be operated more strongly as compared with those of the vehicle in order to maintain the combiantion under pulling condition. In particular, the control of the braking may be such that a settable fixed force is maintained on the coupling independent from the condition of the road or intensity of braking.

As a modification of the embodiment according to FIG. 3 the operation of the force measuring device 1 may be reversed such that the stop means 8 (FIG. 1) would be affected under normal pulling condition whilst the pressure sensor 4 would measure any pushing forces acting on the coupling 42, when going down an inclined road or upon braking of the vehicle.

Whilst with the embodiment of FIG. 3 the force measuring device according to the invention is used in connection with a trailer coupled to a vehicle, many other applications will be apparent to a skilled person in connection with vehicles or any other apparatuses. For example, the force measuring device according to the invention may be integrated to other vehicle parts, as the spring legs, wheel suspensions, the steering system or the motor drive (for determining the torque acting thereon).

An example for an application to other apparatuses than vehicles is the measurement of the advancing force to be applied to tools of milling or tooling machines or for measuring the compression forces for pressing machines.

Figure 4:
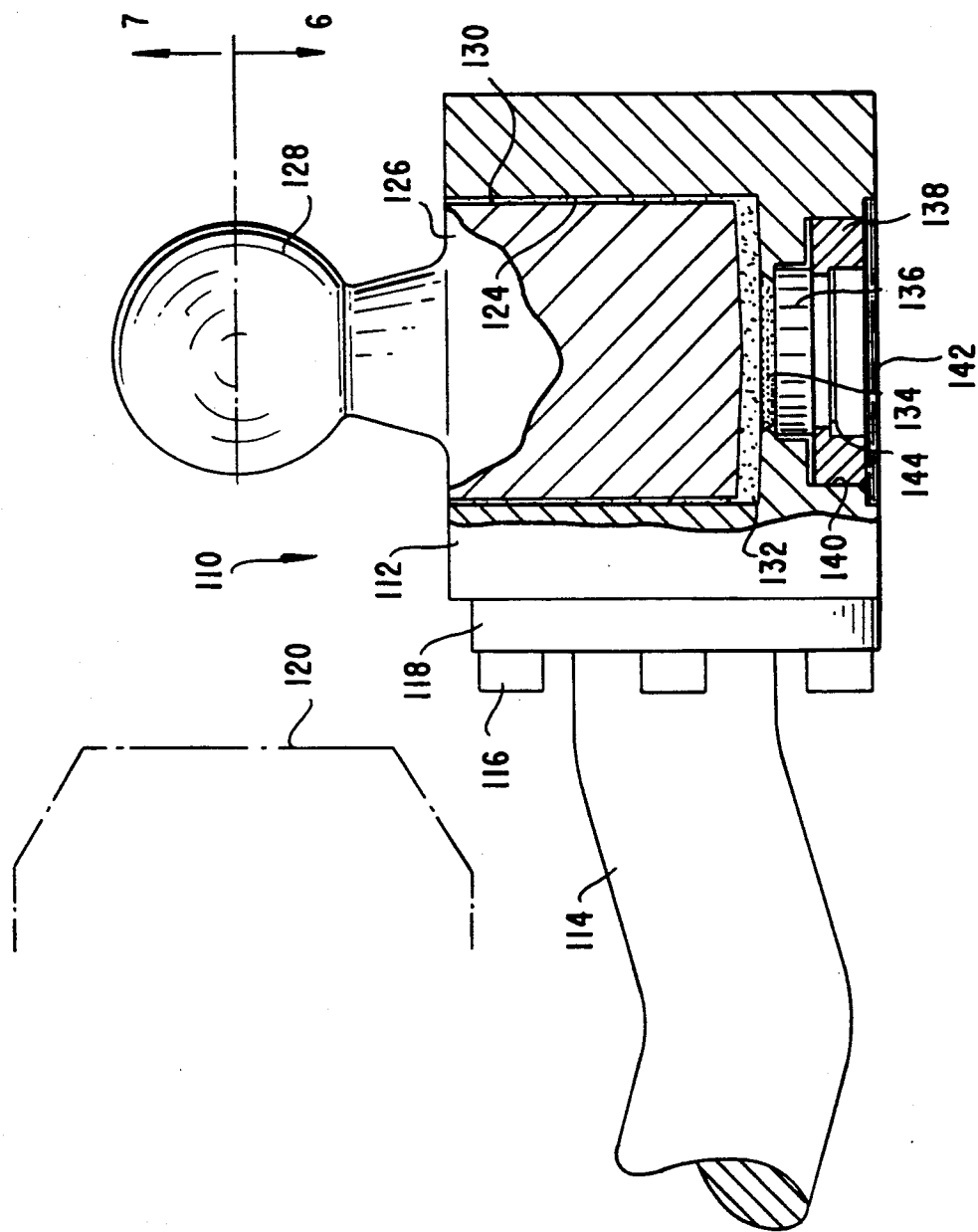
FIG. 4 is a sectional view of a trailer coupling provided with a force measuring device for determining vertical forces exerted on to the trailer coupling.

FIG. 4 shows another embodiment of a trailer coupling 110 again provided with an integrated force measuring device. In this case vertical forces are measured, in particular the load exerted by a one axle trailer (not shown) to the coupling.

Whilst as a force measuring device a design according to FIG. 1 or FIG. 2 could be used the trailer coupling 110 uses a force measuring device as described in more detail in the above mentioned German laid open patent publication.

Specifically, the trailer coupling 110 includes as a housing a cubical metal body 112 connected to a vehicle 120 by means of a bar 114 secured to the metal body 112 by a flange 118 screwed thereto by screws 116.

A cylindrical recess 124 is provided in the metal body 112 extending through a large part of its height, for example 3/4 thereof. The diameter of the recess 124 is in the order of its height.

A piston 126 is inserted into the recess 124 and a ball 128 being formed at its top side for a well known coupling by means of a spherical coupling element, as the coupling element 46 shown in FIG. 3 to a one axle trailer.

The piston 126 has such a diameter, that a cylindrical gap 130 is formed between the peripheral surface of the piston 126 and the peripheral interior surface of the recess 124. Between the interior end surfaces of the piston 126 and the interior bottom of the recess 124 a small space is formed completely filled with elastomeric material, as silicon rubber, as is the gap 130.

The body 112 is provided with a passage 140 at its bottom side having inserted therein a force measuring device in particular a pressure sensor 136 secured in the passage 140 by means of a threaded ring 138. The topside of the pressure sensor 136 is in contact with the elastomeric material in the space 132 via an opening 134.

In the interior of the ring 138 a circuit board 144 is provided for holding electronic circuits of the pressure sensor 136, the ring 138 on its inner opening being closed, preferably air- and humidity tight by means of a plate 142.

It should be noted, that this type of a force measuring device and its manufacture has been disclosed in detail in the above mentioned German laid open patent publication. Such a force measuring device, in particular with dimensions as indicated above, are extremly insensitive against lateral forces, whilst vertical forces may be measured accurately.

The elastomatic material fixedly adheres to the contact surfaces of the piston 126 and the recess 124 resulting in a very stable design.

Upon coupling of the trailer to the ball 128 the vertical force exerted onto the piston 126 is transmitted through the elastomeric material to the pressure sensor 136. The signal generated by the pressure sensor 136 may be used for any desired purpose. For example, with a vehicle provided with a board computer as the microprocessor 47 according to FIG. 3 the vertical force measured by the pressure sensor 136 may be compared with a reference value visual or acoustic alarm being initiated upon exceeding of a predetermined maximum load. Even starting the vehicle may be blocked.

In operation, the board computer may be supplied with a signal corresponding to the actual load for indication thereof and/or for use in optimizing the operation characteristics of the vehicle. Furthermore, the pressure sensor output signal may be generated continuously and may be considerd by the board computer when accelerating or braking or steering thereof. It is of particular importance to control the brakes of the trailer in response to the load exerted to the coupling.

Figure 5:
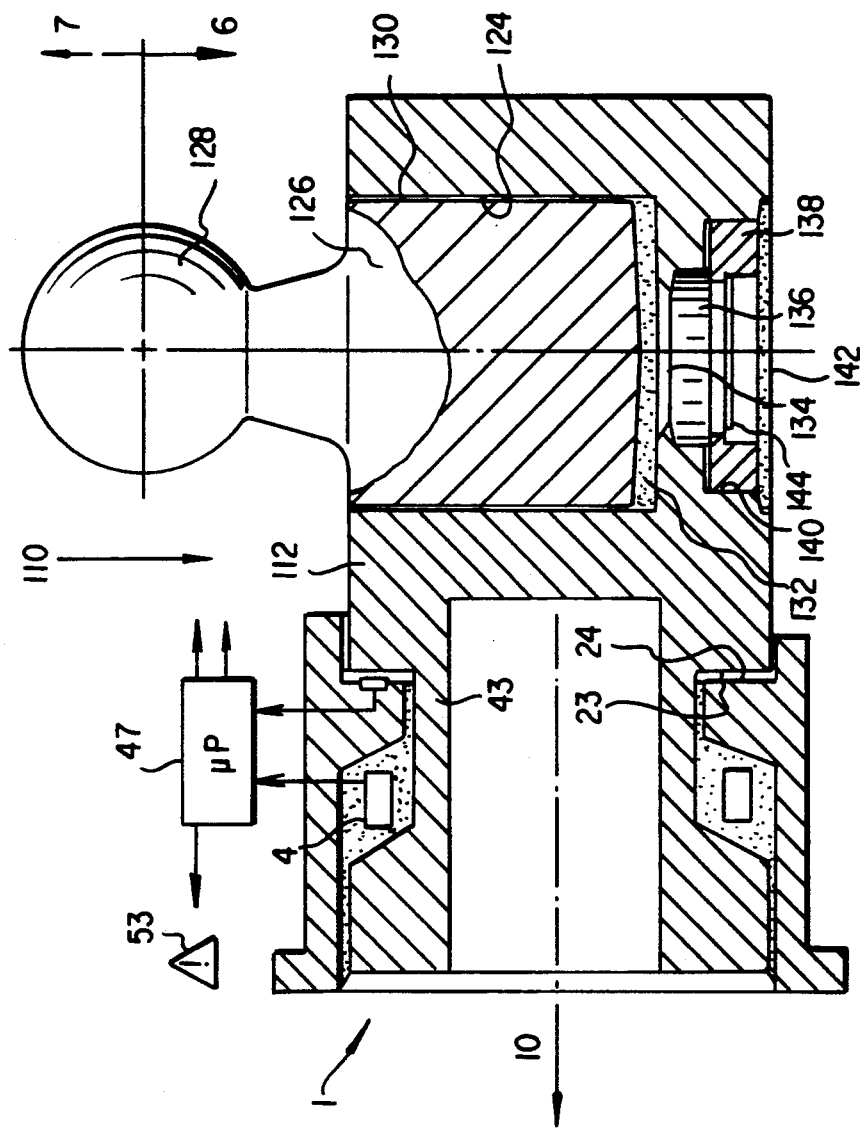
FIG. 5 is a sectional view of a combination of the trailer couplings shown in FIGS. 3 and 4.

As shown in FIG. 5, the embodiment according to FIG. 4 may be easily combined with the embodiment according to FIG. 3. Furthermore, the embodiment according to FIG. 4 may be furnished with the stop or limiting means 8 or 11' of FIG. 1 or 2, epecially if there is the danger or possibility, that vertical forces in the opposite direction 7 may occur, i.e. when the trailer is overloaded in its back region, so that especially on an uneven road the coupling ball 45 may be drawn in the upright direction 7.

Whilst preferably the specific types of force measuring devices according to FIG. 1 and FIG. 2 may be used for the trailer coupling according to FIGS. 3 and/or 4 other force measuring devices as strain gauges may be used as well.

I claim:

1. A trailer coupling having a force measuring device incorporated therein, comprising:
    a first body adapted to be operatively coupled with a tracting vehicle and having an essentially vertical cylindrical recess formed therein;
    a first piston member disposed in said vertical cylindrical recess and forming a small space between an end surface of said first piston member and an interior bottom wall of said vertical cylindrical recess and having projecting therefrom in an upward direction arresting means for engagement with a complementary coupling means of a trailer;
    a pressure sensor means protectedly arranged within said body for sensing pressure; and
    wherein a narrow cylindrical gap is formed between a peripheral surface of said piston member and a cylindrical interior surface of said vertical cylindrical recess, said gap and said small space being essentially completely filled with an essentially incompressible elastomeric material which is in contact with said pressure sensor and strongly adheres to said surfaces of said piston member and said recess.

2. A trailer coupling according to claim 1, further comprising:
    a second body having an essentially horizontal cylindrical recess;
    a second piston member disposed in said horizontal cylindrical recess and forming a narrow essentially cylindrical gap between a peripheral surface of said second piston member and a cylindrical interior surface of said horizontal cylindrical recess;
    said narrow gap being filled with an essentially incompressible elastomeric material strongly adhering to said surfaces of said second piston member and said horizontal cylindrical recess,
    wherein an essentially annular space is formed between opposing essentially radial surfaces of said second piston member and said horizontal cylindrical recess, and further wherein said annular space is filled with an essentially incompressible elastomeric material strongly adhering to surfaces in contact therewith;
    a second pressure sensor means, in contact with said elastomeric material, for generating electrical signals depending on forces acting on said elastomeric material between said second body and said second piston member;
    further opposing surfaces of said annular space forming stop means for limiting a horizontal movement of said second piston member in said horizontal recess in response to an application of excessive horizontal pushing forces exerted by the trailer on the arresting means; and
    wherein said first body is adapted to be coupled to the tracting vehicle by way of said second body and said second piston member, such that one of said second body and second piston member is connected to said first body, and the other of said second body and second piston member is connected to the tracting vehicle.

3. A trailer coupling according to claim 2, wherein said stop means for limiting said movement of said second piston member within said recess is formed by a further force measuring device, wherein two force measuring devices are arranged to measure force in opposite directions, and said further force measuring device is disposed in a further annular space between further opposing essentially radial surfaces with further pressure sensor means being in contact with further essentially incompressible elastomeric material filled in said further annular space.

4. A trailer coupling according to claim 3, wherein said opposing end surfaces of said recess and said projecting means extend in directions which intersect obliquely with a longitudinal axis of said piston member.

5. A trailer coupling according to claim 2, wherein said first and second bodies are formed as an integral member.

6. The trailor coupling of claim 1 having a further force measuring device incorporated thereto for measuring horizontal forces exerted thereon.

7. A device for determining horizontal axial forces exerted by a trailing vehicle onto a trailer coupling between a tracting vehicle and said trailing vehicle, said device comprising:
   a housing having a cylindrical recess defined by an interior peripheral surface and a first essentially radial end surface and provided with mounting means for attaching said housing to said tracting vehicle;
   a piston member concentrically disposed in said recess and provided at one end thereof with arresting means for coupling with said trailing vehicle and having a peripheral surface opposing said interior peripheral surface of said recess and forming a first annular space therewith further defined by said essentially radial end surface of said recess and an end surface of a projecting means projecting from said peripheral surface of said piston member toward said interior peripheral surface of said recess;
   an essentially incompressible elastomeric material provided in said first annular space between said first end surface of said recess and a first end surface of said projecting means; and
   first pressure sensor means arranged within said housing and in contact with said elastomeric material for sensing said axial forces transmitted from said arresting means via said projecting means and said elastomeric material onto said pressure sensor means.

8. The device of claim 7, wherein said recess is further defined by a second end surface opposite to said first end surface and said projecting means having a second end surface forming a second annular space defined by said second end surface of said recess, said second end surface of said projecting means and said opposing peripheral surfaces of said recess and said piston member, said second annular space being provided with essentially incompressible elastomeric material in contact with second pressure sensor means arranged within said housing in contact with said elastomeric material.

9. The device of claim 8, wherein said first pressure sensor means and said second pressure sensor means are embedded in said elastomeric material.

10. The device of claim 8, wherein said housing is incorporated in a body having an essentially vertical cylindrical recess formed therein, said device further comprising:
   a further piston member disposed in said vertical cylindrical recess and forming a small space between an end surface of said piston member and an interior bottom wall of said vertical cylindrical recess and having projecting therefrom in an upward direction said arresting means for engagement with a complementary coupling means of said trailing vehicle;
   a further pressure sensor means protectedly arranged within said body; and
   wherein a narrow cylindrical gap is formed between a peripheral surface of said further piston member and a cylindrical interior surface of said vertical cylindrical recess, said gap and said small space being filled with essentially incompressible elastomeric material which is in contact with said pressure sensor means and strongly adheres to said surfaces of said piston member and said recess.

11. The device of claim 7, wherein said first pressure sensor means are embedded in said elastomeric material.

12. The device of claim 7, wherein said housing is provided with stop means an end surface thereof opposing an end surface of radial flange means formed on said piston member.

13. The device of claim 12, further comprising electrical contact means arranged between said stop means and said end surface of said flange means and closed upon application of excessive axial pushing forces.

14. The trailor coupling of claim 12 wherein said stop means is formed as a further force measuring device.

15. The device of claim 7, wherein outside a region of said first annular space and in a region of said projecting means a narrow annular gap is formed between said opposing peripheral surfaces of said recess and of said piston member and a peripheral surface of said projecting means, said annular gap being filled with said elastomeric material strongly adhering to surfaces in contact therewith.

16. The device of claim 7, wherein said housing is incorporated in a body having an essentially vertical cylindrical recess formed therein, said device further comprising:
   a further piston member disposed in said vertical cylindrical recess and forming a small space between an end surface of said piston member and an interior bottom wall of said vertical cylindrical recess and having projecting therefrom in an upward direction said arresting means for engagement with a complementary coupling means of said trailing vehicle;
   a further pressure sensor means protectedly arranged within said body; and
   wherein a narrow cylindrical gap is formed between a peripheral surface of said further piston member and a cylindrical interior surface of said vertical cylindrical recess, said gap and said small space being filled with essentially incompressible elastomeric material which is in contact with said pressure sensor means and strongly adheres to said surfaces of said piston member and said recess.

* * * * *

UNITED STATES PATENT AND TRADEMARK OFFICE
CERTIFICATE OF CORRECTION

PATENT NO. : 5,149,121
DATED : September 22, 1992
INVENTOR(S) : Hafner

It is certified that error appears in the above-indentified patent and that said Letters Patent is hereby corrected as shown below:

On the Title page, item [73] change the assignee to read -- Pfister GmbH--.

Signed and Sealed this

Nineteenth Day of October, 1993

Attest:

BRUCE LEHMAN

Attesting Officer     Commissioner of Patents and Trademarks